Feb. 14, 1961

E. F. ARDELL 2,971,677

FEEDING DEVICE

Filed Aug. 26, 1957

INVENTOR.
EDGAR F. ARDELL
BY
Kenyon & Kenyon
ATTORNEYS

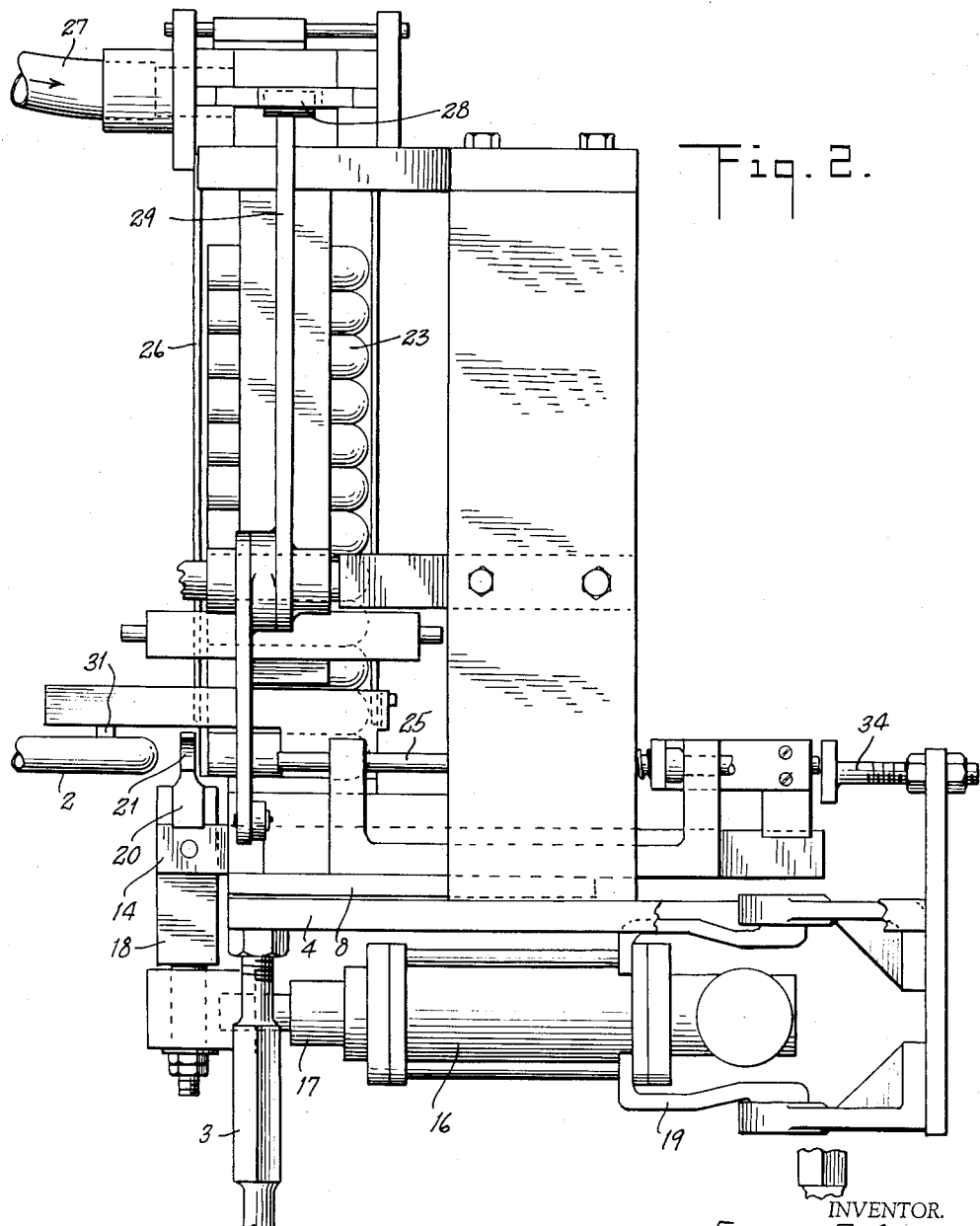

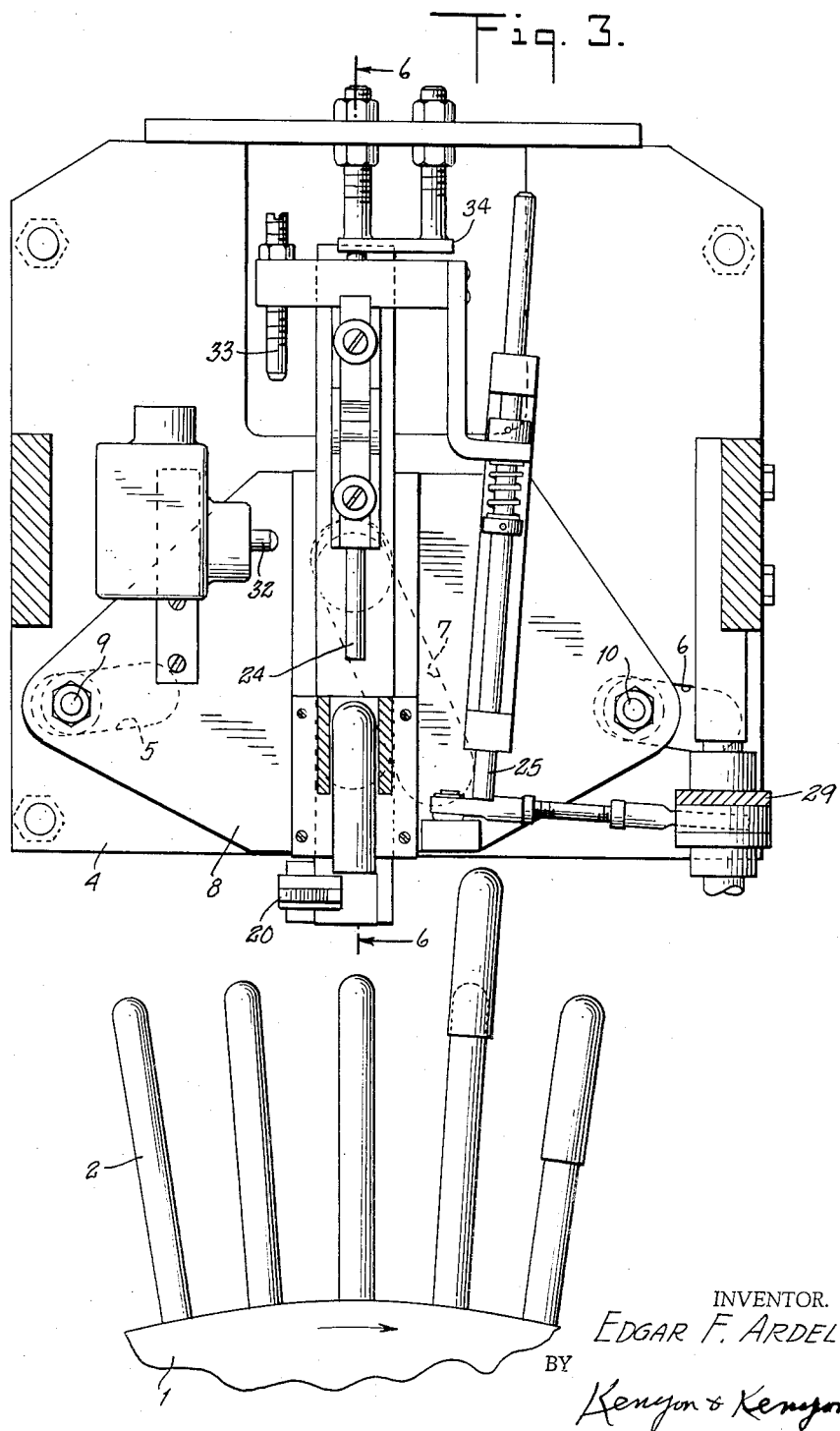

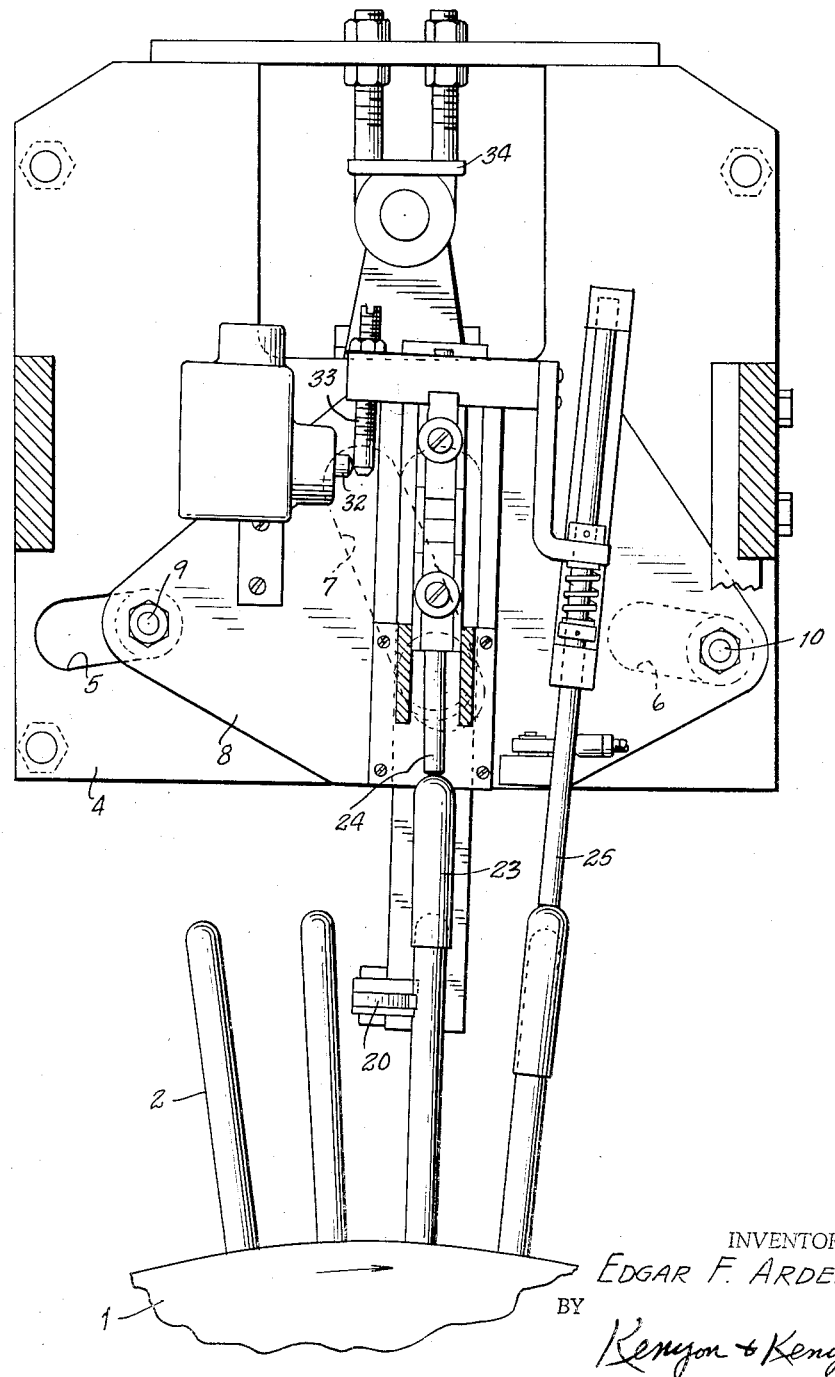

Feb. 14, 1961 E. F. ARDELL 2,971,677
FEEDING DEVICE
Filed Aug. 26, 1957 6 Sheets-Sheet 5
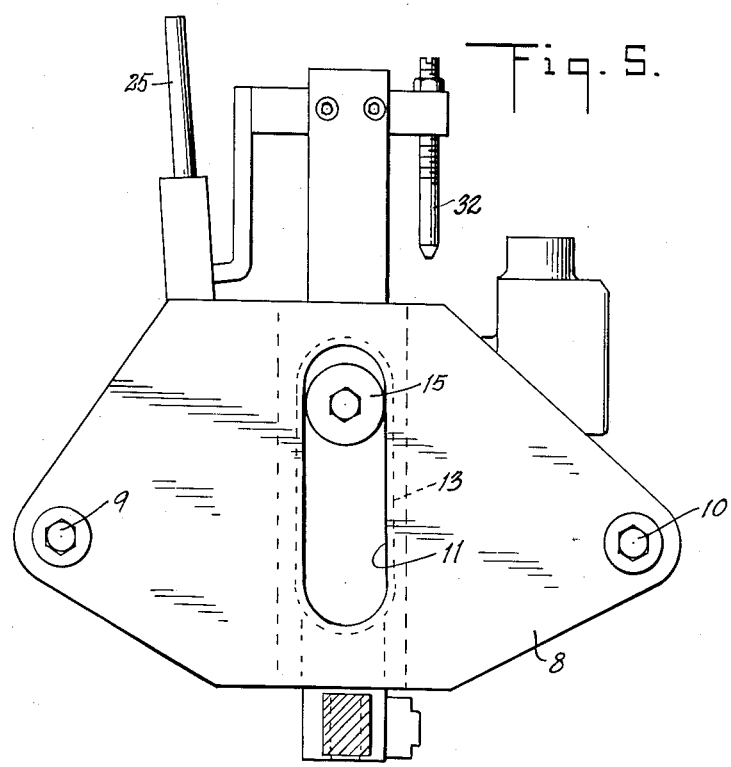
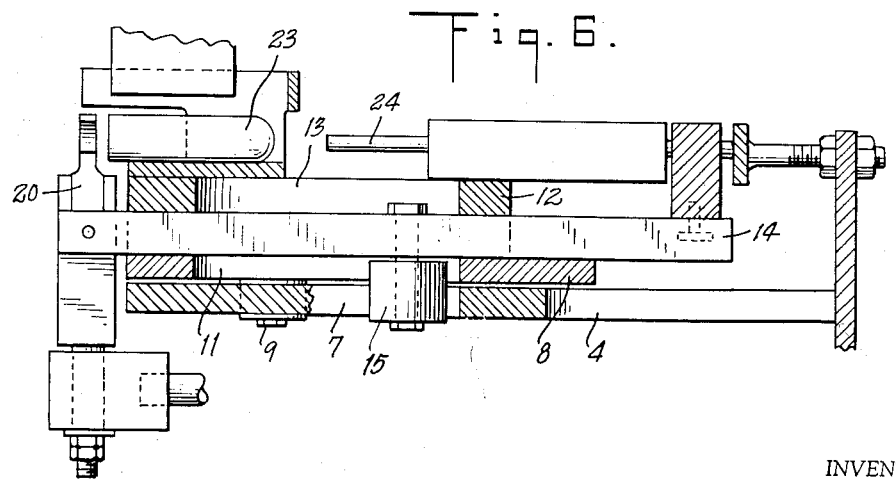
INVENTOR.
EDGAR F. ARDELL
BY
Kenyon & Kenyon
ATTORNEYS Feb. 14, 1961  E. F. ARDELL  2,971,677
FEEDING DEVICE
Filed Aug. 26, 1957  6 Sheets-Sheet 6
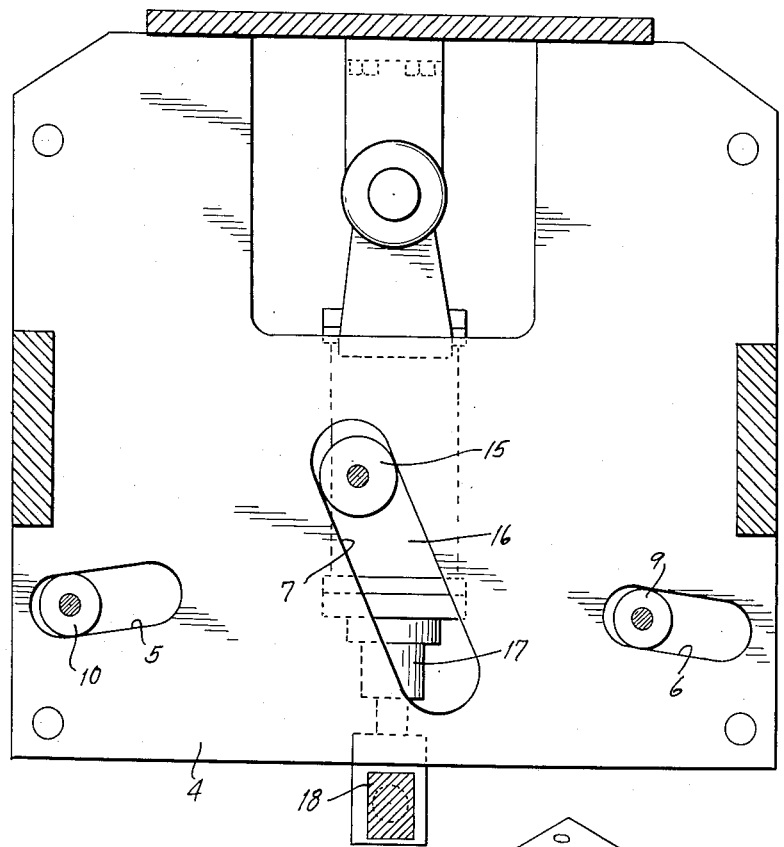
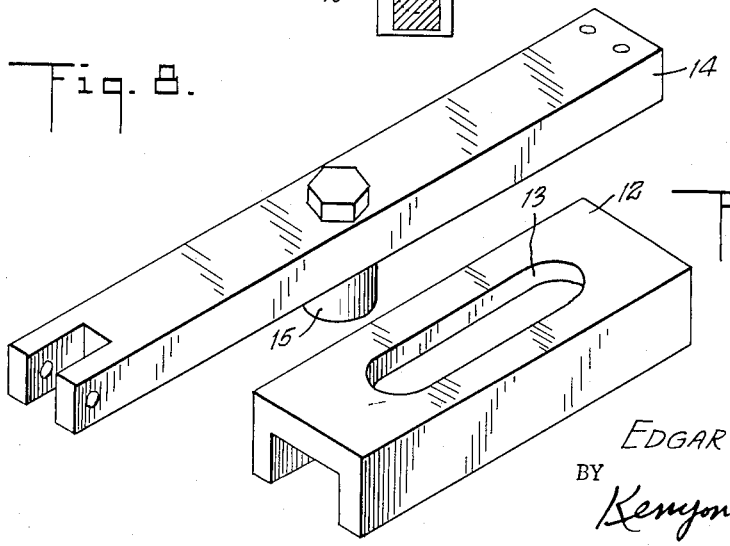
INVENTOR.
EDGAR F. ARDELL
BY
Kenyon + Kenyon
ATTORNEYS

United States Patent Office

2,971,677
Patented Feb. 14, 1961

2,971,677

FEEDING DEVICE

Edgar F. Ardell, 409 Pine St., Middletown, Conn.

Filed Aug. 26, 1957, Ser. No. 680,335

6 Claims. (Cl. 221—236)

The present invention relates to a feeding device adapted to automatically feed, either selectively or in succession, a plurality of articles to article holders adapted to receive the articles and moving in a predetermined direction.

More particularly, the invention is concerned with a feeding device which will automatically place tube-like articles on spindles extending radially from a wheel rotating in a horizontal plane, the articles and spindles being maintained in axial alignment during the period that the articles are being placed on the spindles. The feeding device of the present invention may be utilized to feed any tube-like article such as lipstick shells, fountain pen shells, flashlight shells, etc. to a buffing, grinding, painting, cleaning or milling machine.

In industrial applications where tube-like articles are manufactured the articles are subjected to a number of operations during manufacture. The rough shells, for example, are subjected to grinding, milling, cleaning, buffing, painting and numerous other operations. Prior to this invention these operations were performed by manually placing each article on spindles extending radially from a wheel rotating in a horizontal plane, the wheel carrying the article to a buffing or grinding machine or to other machines to perform various operations required during the manufacturing cycle. These articles were placed on the spindles by hand since the outer shells are thin and it was desired to avoid damage to the articles, and consequent rejects, during the manufacturing operation. Since the wheel containing the radial spindles is rotating at a constant angular velocity, however, it often happens that the operator fails to place an article on each spindle. The empty spindle is consequently subjected to a buffing, grinding or other operation which damages the spindle and necessitates frequent replacement. This manual operation also increases the cost of each article and limits the quantity that can be produced on each machine.

In view of the foregoing, it is the primary object of this invention to provide a feeding device which will automatically place tube-like articles selectively or in succession upon empty spindles extending radially from a wheel rotating in a horizontal plane and to place the articles upon the spindles without damaging the articles.

Another object of this invention is to provide a feeding device for placing tube-like articles on spindles extending radially from a wheel rotating in a horizontal plane, in which a radial and arcing motion is imparted to the article such that the article and spindle are in axial alignment during the period of transfer from the feeder to the spindle.

A further object of this invention is to provide a feeding device for placing tube-like articles on spindles extending radially from a wheel rotating in a horizontal plane in which an article is placed on every empty spindle passing the device and to place the article on the spindle without damaging the article where the clearance between the inner diameter of the article and the outer diameter of the spindle is small.

Other objects and advantages of the invention will become apparent from the following description taken in connection with the accompanying drawings, in which:

Figure 2 is a side elevational view of the feeding device of the present invention;

Figure 3 is a cross-section taken on lines 3—3 of Figure 1, illustrating in addition a portion of the wheel and radially extending spindles, the feeding device being shown in position to place an article on a spindle;

Figure 4 is a cross-section taken on lines 3—3 of Figure 1 similar to Figure 3 but illustrating the feeding device in its forward position placing an article on a spindle;

Figure 5 is a bottom view of the carriage of the present invention;

Figure 6 is a cross-section taken along lines 6—6 of Figure 3;

Figure 7 is a cross-section taken along lines 7—7 of Figure 1, the view otherwise being a top view of the base plate of the present invention;

Figure 8 is a perspective view of the slide of the present invention, and

Figure 9 is a perspective view of the slide gib of the present invention.

Figure 1:
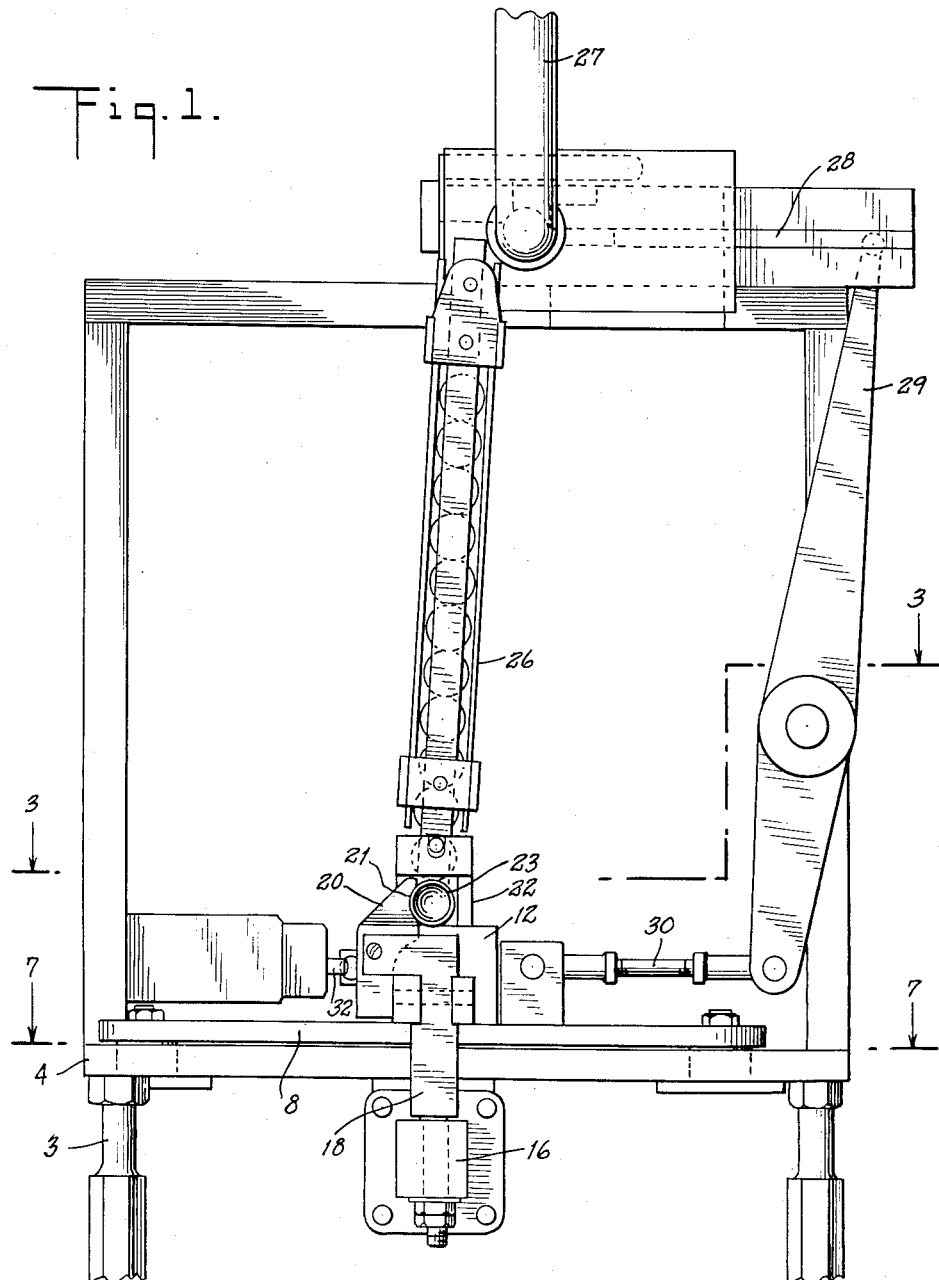
Figure 1 is a front elevational view of the feeding device of the present invention.

For purposes of illustrating the feeding device of the present invention will be described with reference to the buffing of lipstick shells. It is to be understood, however, that the device of the present invention may be utilized as well to feed any tube-like article to spindles located on any other types of machine. The buffing machine or work carrier consists of a circular drum or wheel generally denoted by the numeral 1. This wheel rotates in a horizontal plane and is provided with a plurality of spindles 2 spaced around the outer circumference of the wheel and extending radially therefrom. The spacing between the respective spindles does not have to be uniform, the only requirement being that the spindles extend radially from the wheel.

The feeding device of the present invention is placed adjacent to, but spaced from, the wheel 1 and is supported by a main frame 3. Secured to the top of the main frame 3 is a base plate 4 which lies in a horizontal plane. As illustrated in Figure 7, this base plate is provided with two cam slots 5 and 6 and a cam track 7. The cam slots 5 and 6 are segments of an arc having its center at the center of the wheel 1 for a purpose to be presently described. It is therefore seen that the cam slots are concentric with the outer circumference of the wheel 1. As illustrated in Figure 7, the cam track is biased with respect to the cam slots in a manner and for a purpose to be presently described.

Positioned on top of the base plate 4 is a carriage 8 illustrated in Figure 5. This carriage 8 is provided with cam rolls 9 and 10 which extend perpendicularly from the carriage 8 and are movable in the cam slots 5 and 6. A slotted guideway 11 is formed in the carriage 8 intermediate the cam rolls 9 and 10 and at right angles to a line connecting the cam rolls. It is therefore seen that the carriage 8 is movable on the base plate 4 in an arc-like motion by the motion of the cam rolls 9 and 10 in the cam slots 5 and 6, the motion of this carriage being concentric with the wheel 1.

Secured to the carriage 8 is slide gib 12 illustrated in Figure 9. This slide gib is attached to the carriage in overlapping relation with the slotted guideway 11 and in such manner that the forward edge of the slide gib lies in the vertical plane formed by the forward edge of the carriage 8. The top of the slide gib is provided with a slotted opening 13 in registration with the slotted guideway 11. As illustrated in Figure 9, the slide gib 12 is channeled to provide a guideway for slide 14 which is slidably movable in this channel on carriage 8. The slide 14 is illustrated in Figure 8 and is provided with a guide roll 15 extending perpendicularly from the slide and of such length that it extends through the slotted guideway 11 in the carriage 8 and the cam track 7 in the base plate 4. The slide 14 is free to move in the slide gib 12 only to the extent that the cam rolls 9 an 10 will permit while moving in the cam slots 5 and 6 in the base plate 4. The slotted opening 13 in the slide gib 12 is provided to permit free movement of the nut securing guide roll 15 to slide 14 as this slide moves in gib 12. In a similar manner, the slotted guideway 11 in the carriage 8 is provided to allow the guide roll 15 to extend through the carriage 8 and into engagement with the cam track 7 in the base plate 4.

It can, therefore, be seen that if force is applied to the slide 14 to move it forward in the slide gib 12 an arcing motion will be imparted to the carriage 8 by the slide 14 through the guide roll 15 moving in the cam track 7. A two-fold motion is therefore imparted to the slide—a radial motion respecting the wheel 1 and also a circular motion concentric with the motion of the spindles 2.

The force required to move the slide is supplied by power cylinder 16 located beneath the base plate 4. The piston rod 17 of the power cylinder may be activated in any conventional manner, such, for example, as by compressed air. The end of the piston rod 17 is connected to the forward end of the slide 14 by means of a connecting rod 18. The end of the power cylinder 16 opposite the piston rod 17 is fastened to the main frame 3 by means of a trunnion mount 19, in order to allow the power cylinder 16 to arc as the slide is moved back and forth in the slide gib.

Mounted on the upper end of the connecting rod 18 is a spindle setting finger 20. This finger 20 is provided with a concave depression 21 having the same curvature or from as the spindles 2. The height of this finger 20 is such that the depression 21 is axially aligned with the center lines of the spindles 2. If force is applied to move the slide 14 forward as a spindle 2 is axially aligned with the finger 20, the finger 20 will also move forward and follow a path of curvature concentric with the path of travel of the spindles. If the power applied to move the slide 14 is such that the angular velocity of the finger 20 is greater than the angular velocity of the spindles 2, the finger 20 will catch up with and contact the spindle 2 as well as move forward in the radial direction of the spindle. When the finger 20 contacts the spindle 2, the spindle will decrease the angular velocity of the finger 20 until it is travelling at the same rate as the spindle 2. After a defined motion by the slide 14, the cylinder is reversed in a manner to be described, and the slide moves back to its original position to await the approach of the next spindle.

Secured to the top of the slide gib 12 is a shell receptacle 22 which is channeled to hold one or more shells 23 in vertical alignment. The shell receptacle 22 is secured to the slide gib 12 in such manner that its forward edge is flush with the forward edge of the slide gib. The top of the receptacle is open so that a new shell may be inserted as the botom-most shell is ejected. The depth of the channel in the shell receptacle is such that the center line of the bottom shell is aproximately in alignment with the center line of the spindles 2.

An elongated rod 24 is positioned behind the shell receptacle and in axial alignment with the bottom-most shell in the shell receptacle. As the slide 14 moves forward this rod 24 also moves forward and ejects the shell 23 from the shell receptacle 22 onto the spindle 2. If desired, the length of this rod 24 may be adjusted to only partially insert the shell 23 on the spindle 2. In this event, a second pusher rod 25 may be located adjacent the rod 24, but offset from it, and of such length that on the next cycle of the slide 14, the pusher rod 25 completes the insertion of the shell 23 on the spindle 2. This is illustrated in Figure 4 where the pusher rod 25 is shown completing the insertion of the shell 23 on the spindle 2 which was ejected from the shell receptacle 22 on the previous cycle of the slide 14. A plurality of these secondary pusher rods may be provided, if desired. It is to be noted, however, that these secondary rods, such, for example, as pusher rod 25, must be spaced such that they are in axial alignment with the spindles 2 on each cycle of the slide 14.

A shell magazine 26 is mounted above the shell receptacle 22 and designed to hold a plurality of shells 23 in vertical alignment. This magazine 26 is pivoted at its upper end in such manner that it oscillates with the motion of the shell receptacle. The shells 23 are fed from a hopper (not shown) which aligns the shells and through a chute 27 which is offset from the pivot point of the shell magazine 26.

On each cycle of the slide 14 a shell is removed from the chute 27 and pushed at right angles into vertical alignment with the shells in the shell magazine. The shells are moved by pusher rod 28 which is activated by lever 29. The other end of lever 29 is connected to the carriage 8 by means of connecting rod 30.

In operation, the shell magazine 26 is filled with shells 23, such, for example as lipstick containers, the open end of the shell being positioned in the direction of the spindles 2. The hopper (not shown) is filled with shells and the wheel 1 is placed in operation, rotating, for example, in a clockwise direction. As one of the spindles 2 approaches axial alignment with the slide 14, this spindle makes contact with the micro switch 31 which is secured to the main frame 3 and extends over the spindles 2. When this micro switch is contacted by the spindle 2 it activates the power cylinder 16 moving the piston rod 17 in a forward direction. The piston rod 17 through the connecting rod 18, which is connected to the slide 14, moves the slide 14 forward and in the radial direction of wheel 1. As the slide 14 moves, in this radial direction, the carriage 8 is moved in a circular clockwise path concentric with the outer circumference of the wheel 1. This motion is imparted to the carriage 8 as previously described by means of guide roll 15 which extends from slide 14 through the cam track 7 in the base plate 4. Since the cam track 7 is biased with respect to the slotted guideway 11 in the carriage 8, the slide 14 can only move forward to the extent that the cam rolls 9 and 10 extending from the carriage 8 are free to move in the cam slots 5 and 6 in the base plate 4.

As the slide 14 moves forward, the spindle setting finger 20 is inserted between the spindles 2, and since the angular velocity of the carriage 8 is greater than the angular velocity of the spindles 2, the spindle setting finger 20 catches up with and engages the spindles 2. When this contact is made, the angular velocity of the carriage 8 is retarded until the carriage and the spindles are moving at the same angular velocity. At approximately this instant the spindle which is engaged by the spindle setting finger 20 is in axial alignment with the shell 23 in the shell receptacle 22. This axial alignment is maintained since the carriage 8 and the spindle 2 are rotating at the same angular velocity. As the slide 14 continues to move forward, rod 24 engages the closed end of the shell 23 in the shell receptacle 22, and pushes the shell 23 forward and into engagement with the spindle in contact with the spindle setting finger 20.

When the slide 14 has moved forward a sufficient distance to partially place the shell 23 on the spindle 2, micro switch 32 is engaged by rod 33. This reverses the power cylinder 16 which reverses the direction of motion of slide 14. As slide 14 starts its reverse motion spindle setting finger 20 is disengaged from the spindle 2 and carriage 8 is rotated in a counterclockwise direction. The reverse motion of the slide 14 is continued until it abuts against the stop 34. During the reverse motion of the slide 14, pusher rod 28 ejects a shell from the chute 27 and places it in the shell magazine 26. The feeding device then is in position for the next cycle.

What has been described is a feeding device which will either selectively or in succession place tube-like articles on spindles rotating in a horizontal plane. This may be done rapidly and without damage to the shells while maintaining a very close tolerance between the outer diameter of the spindles and the inner diameter of the shells. This is achieved in the device of the present invention by imparting both a radial motion to the shells and an angular motion which is concentric with the motion of the spindles. It is to be noted that regardless of the spacing between the spindles 2, the device of the present invention will detect the presence of a spindle in any radial position and activate the feeder machine to place a shell on the spindle. Since the spindles 2 activate the device of the present invention through contact with micro switch 31, the mechanism will not operate unless a spindle is in the proper position. It is to be understood that although the invention has been described with reference to a buffing wheel that is rotating, the device may also be utilized to place tube-like articles on spindles moving in a path perpendicular to the slide 14. In this event, the cam slots 5 and 6 in the base plate 4 are constructed such that they are also perpendicular to the slide 14 such that the motion of the carriage 8 is a straight line oscillatory motion which is parallel to the path of the spindles 2.

I claim:

1. A device for successively feeding tubular shells from a feeding station onto a work carrier constituted by a continuous train of spindles adapted to receive and convey said shells and extending radially from a wheel rotating relative to said station at a predetermined speed, said device at said feeding station comprising a base plate, a carriage resting on said base plate and connected thereto by cam rolls such that said carriage is moveable on said base plate in a direction corresponding to that of said spindles, said carriage supporting a slider mechanism moveable thereon and adapted to advance axially toward said carrier, power means to advance said slider mechanism, roller means interconnecting said slider mechanism and said carriage and adapted to shift the position of said carriage on said base plate at a speed corresponding to that of the spindles as the slider mechanism is advanced axially toward said carrier, a shell receptacle secured to said carriage and moveable therewith and adapted to receive shells such that they are in axial alignment with said carrier, and rod means adapted to eject a shell from said receptacle as said slider mechanism advances axially toward said carrier whereby said shell is received coaxially by a spindle thereon.

2. A device for successively feeding tubular shells from a feeding station onto a work carrier constituted by a continuous train of spindles adapted to receive and convey said shells and extending radially from a wheel rotating relative to said station at a predetermined speed, said device at said station comprising a base plate, a carriage resting on said base plate and connected thereto by cam rolls such that said carriage is moveable on said base plate in a direction corresponding to that of said spindles, said carriage supporting a slider mehcanism moveable thereon and adapted to advance axially toward said carrier, power means to advance said slider mechanism, roller means interconnecting said slider mechanism and said carriage and adapted to shift the position of said carriage on said base plate in a direction corresponding to that of said spindles as the slider mechanism advances axially toward said carrier, a spindle setting finger mounted on said slider mechanism and adapted to engage a spindle extending from said carrier as said slider mechanism advances axially toward said carriage such that the slider mechanism is maintained in axial alignment with and rotating at the same speed as said engaged spindle, a shell receptacle secured to said carriage and moveable therewith and adapted to receive shells such that they are in axial alignment with said carrier, and rod means adapted to eject a shell from said receptacle as said slider mechanism advances axially toward said carrier whereby said shell is received coaxially by said engaged spindle.

3. A device for successively feeding tubular shells from a feeding station onto a work carrier constituted by a continuous train of spindles adapted to receive and convey said shells and extending radially from a wheel rotating relative to said station at a predetermined speed, said device at said station comprising a base plate, a carriage resting on said base plate and connected thereto by cam rolls such that said carriage is moveable on said base plate in a direction corresponding to that of said spindles, a slide gib secured to said carriage and moveable therewith, a slider mechanism moveable in said slide gib and adapted to advance axially toward said carrier, power means to move said slider mechanism, roller means interconnecting said slider mechanism and said carriage and adapted to shift the position of said carriage on said base plate in a direction corresponding to that of said spindles as the slider mechanism is moved in said slide gib, a spindle setting finger setting finger mounted on said slider mechanism and adapted to engage a spindle extending from said carrier as said slider mechanism advances axially toward said carrier such that the slider mechanism is maintained in axial alignment with and moving at the same speed as said engaged spindle, a shell receptacle secured to said slide gib and adapted to receive a shell such that it is in axial alignment with said carrier, a rod positioned in axial alignment with the shell in the shell receptacle and adapted to move forward with said slider mechanism and eject said shell from the shell receptacle whereby said shell is received coaxially by said engaged spindle, and switch means for activating said power means to move the slider mechanism axially toward said carrier and to reverse the direction of motion of said slider mechanism after it has moved a predetermined distance.

4. A device for successively feeding tubular shells from a feeding station onto a work carrier constituted by a continuous train of spindles adapted to receive and convey said shells and extending radially from a wheel rotating relative to said station at a predetermined speed, said device at said station comprising a base plate, a carriage resting on said base plate and connected thereto by cam rolls such that said carriage is moveable on said base plate in a direction corresponding to that of said spindles, a slide gib secured to said carriage and moveable therewith, a slider mechanism moveable in said slide gib and adapted to advance axially toward said carrier, power means to move said slider mechanism, roller means interconnecting said slider mechanism and said carriage adapted to shift the position of said carriage on said base plate in a direction corresponding to that of said spindles as the slider mechanism is moved in said slide gib, a spindle setting finger mounted on said slider mechanism and adapted to engage a spindle extending from said carrier as said slider mechanism advances axially toward said carrier such that the slider mechanism is maintained in axial alignment with and moving at the same speed as said engaged spindle, a shell receptacle secured to said slide gib and adapted to receive a shell such that it is in axial alignment with said carrier, a rod positioned in axial alignment with the shell in the shell receptacle and adapted to move forward with said slider mechanism, and eject said shell from the shell receptacle whereby said shell is received coaxially by said engaged spindle, a shell magazine positioned above said shell receptacle and adapted to gravitationally feed shells thereto, and switch means for activating said power means to move the slider mechanism axially toward said carrier and to reverse the direction of motion of said slider mechanism after it has moved a predetermined distance.

5. A device in accordance with claim 4 wherein said switch means for activating the power means is constituted by a micro switch adapted to be engaged by a spindle as it approaches axial alignment with the slider.

6. A device for successively feeding tubular shells from a feeding station onto a work carrier constituted by a continuous train of spindles adapted to receive and convey said shells and extending radially from a wheel rotating relative to said station at a predetermined speed, said device at said station comprising a base plate having two cam slots which are portions of an arc concentric with said wheel and a cam track intermediate said cam slots and biased therefrom, a carriage resting on said base plate and connected thereto by two cam rolls moveable in said cam slots such that said carriage is moveable on said base plate in a direction corresponding to that of said spindles, said carriage having a slotted guideway intermediate said cam rolls and axially aligned with said spindles, a slide gib secured to said carriage and moveable therewith and having a slotted opening in registration with the slotted guideway on the carriage, a slider mechanism moveable in said slide gib axially toward said wheel and having a guide roll extending therefrom moveable in said cam track and slotted guideway and adapted to shift the position of the carriage on the base plate in a direction corresponding to that of said spindles as the slider mechanism is moved in the slide gib, power means to move said slider mechanism, a spindle setting finger mounted on said slider mechanism and adapted to engage a spindle extending from said wheel as said slider mechanism advances axially toward said wheel such that the slider mechanism is maintained in axial alignment with and moving at the same speed as said engaged spindle, a shell receptacle secured to the top of said slide gib and adapted to receive a shell such that it is in axial alignment with said carrier, a rod positioned in axial alignment with the shell in the shell receptacle and adapted to move forward with said slider mechanism and eject the shell from the shell receptacle whereby said shell is received coaxially by said engaged spindle, a shell magazine positioned above said shell receptacle and movable therewith and adapted to gravitationally feed shells to said shell receptacle, and switch means for activating said power means to move the slider mechanism axially toward said wheel when a spindle approaches axial alignment with said slider mechanism and to reverse the direction of motion after the slider mechanism has moved a predetermined distance.

References Cited in the file of this patent
UNITED STATES PATENTS

| | | |
|---|---|---|
| 2,500,376 | Pellow et al. | Mar. 14, 1950 |
| 2,648,419 | Detrez | Aug. 11, 1953 |
| 2,698,478 | Heisterkamp et al. | Jan. 4, 1955 |
| 2,776,781 | Birchler et al. | Jan. 8, 1957 |

FOREIGN PATENTS

| | | |
|---|---|---|
| 130,708 | Sweden | Jan. 30, 1951 |